US012023634B2

(12) United States Patent
Hildreth et al.

(10) Patent No.: US 12,023,634 B2
(45) Date of Patent: Jul. 2, 2024

(54) REAL TIME BLENDING SYSTEM VIA A SINGLE PUMP

(71) Applicant: Brine Masters, LLC, Carmel, IN (US)

(72) Inventors: Clay Hildreth, Carmel, IN (US); Christopher Robert Thomas, Raleigh, NC (US); Andrew John Humke, Dubuque, IA (US)

(73) Assignee: Brine Masters, LLC, Carmel, IN (US)

( * ) Notice: Subject to any disclaimer, the term of this patent is extended or adjusted under 35 U.S.C. 154(b) by 415 days.

(21) Appl. No.: 17/227,242

(22) Filed: Apr. 9, 2021

(65) Prior Publication Data

US 2021/0316260 A1 Oct. 14, 2021

Related U.S. Application Data

(60) Provisional application No. 63/008,371, filed on Apr. 10, 2020.

(51) Int. Cl.

| | |
|---|---|
| ***B01F 21/00*** | (2022.01) |
| ***B01F 21/20*** | (2022.01) |
| ***B01F 23/40*** | (2022.01) |
| ***B01F 35/13*** | (2022.01) |
| ***B01F 35/21*** | (2022.01) |

(Continued)

(52) U.S. Cl.

CPC .............. *B01F 21/15* (2022.01); *B01F 21/20* (2022.01); *B01F 23/405* (2022.01); *B01F 35/13* (2022.01); *B01F 35/21112* (2022.01); *B01F 35/2113* (2022.01); *B01F 35/212* (2022.01); *B01F 35/2214* (2022.01); *B01F 35/2217* (2022.01); *B01F 35/718051* (2022.01); *B01F 35/7544* (2022.01); *B01F 35/833* (2022.01);

(Continued)

(58) Field of Classification Search

CPC .... B01F 35/7544; B01F 21/15; B01F 35/212; B01F 21/503; F04D 27/004

See application file for complete search history.

(56) References Cited

U.S. PATENT DOCUMENTS

| | | | |
|---|---|---|---|
| 7,366,621 | B2 | 4/2008 | Sprague |
| 7,810,987 | B2 | 10/2010 | Hildreth |

(Continued)

FOREIGN PATENT DOCUMENTS

| | | |
|---|---|---|
| KR | 10-0851776 | 8/2008 |
| WO | WO 2009/123456 A2 | 10/2009 |

OTHER PUBLICATIONS

Henderson Products, Inc., “Henderson BrineXtreme Infinity Demonstration”, uploaded to YouTube on Jul. 18, 2018, pp. 1-21, Uploaded by “Henderson Products” YouTube account, Available at https://www.youtube.com/watch?v≤j1RX2x-9Fn4.

*Primary Examiner* — Anshu Bhatia

(74) *Attorney, Agent, or Firm* — Hussey IP, LLC

(57) ABSTRACT

Systems and methods for blending fluids are provided. A blended fluid may be obtained by mixing a first fluid from a first fluid source with a second fluid from a second fluid source. The blended fluid may be pumped by a pump arranged downstream of a point at which the first and second fluids are mixed, wherein no other pumps are upstream of the pump. First and second flow control valves that control the flow rate of the first and second fluids, respectively, are adjusted so as to reach a target flow rate of the blended fluid, the blended fluid having a target blend of the first fluid and the second fluid.

17 Claims, 2 Drawing Sheets

(51) Int. Cl.

| | |
|---|---|
| ***B01F 35/212*** | (2022.01) |
| ***B01F 35/221*** | (2022.01) |
| ***B01F 35/71*** | (2022.01) |
| ***B01F 35/75*** | (2022.01) |
| ***B01F 35/83*** | (2022.01) |
| ***F04D 27/00*** | (2006.01) |
| ***F04D 29/66*** | (2006.01) |

(52) U.S. Cl.
CPC ........... *F04D 27/004* (2013.01); *F04D 29/66* (2013.01); *B01F 21/503* (2022.01)

(56) References Cited

U.S. PATENT DOCUMENTS

| | | | | |
|---|---|---|---|---|
| 8,251,569 | B2 | 8/2012 | Hildreth | |
| 8,382,364 | B2 | 2/2013 | Hildreth | |
| 8,870,444 | B2 | 10/2014 | Hildreth | |
| 9,156,013 | B2 | 10/2015 | Hildreth et al. | |
| 10,253,230 | B1 * | 4/2019 | Barger ................ | B01F 35/2205 |
| 10,376,854 | B2 | 8/2019 | Hildreth et al. | |
| 10,544,340 | B2 | 1/2020 | Nesheim et al. | |
| 10,766,010 | B2 | 9/2020 | Nesheim et al. | |
| 10,960,363 | B2 | 3/2021 | Hildreth et al. | |
| 2009/0092001 | A1 | 4/2009 | Hildreth et al. | |
| 2013/0048562 | A1 * | 2/2013 | Keister ..................... | C02F 9/00<br>423/166 |
| 2013/0099155 | A1 * | 4/2013 | Nesheim ............... | B01F 21/221<br>422/275 |
| 2017/0097295 | A1 | 4/2017 | Verkanck et al. | |
| 2018/0258736 | A1 * | 9/2018 | Urdaneta ................ | E21B 33/13 |
| 2020/0041481 | A1 | 2/2020 | Burgess | |
| 2021/0178343 | A1 | 6/2021 | Hildreth et al. | |

* cited by examiner

REAL TIME BLENDING SYSTEM VIA A SINGLE PUMP

CROSS-REFERENCE TO RELATED APPLICATIONS

This application is a non-provisional application of U.S. provisional patent application 63/008,371 filed Apr. 10, 2020, the entire contents of which is hereby incorporated by reference.

TECHNICAL FIELD

This application relates to industrial equipment and, in particular, to fluid blending systems.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
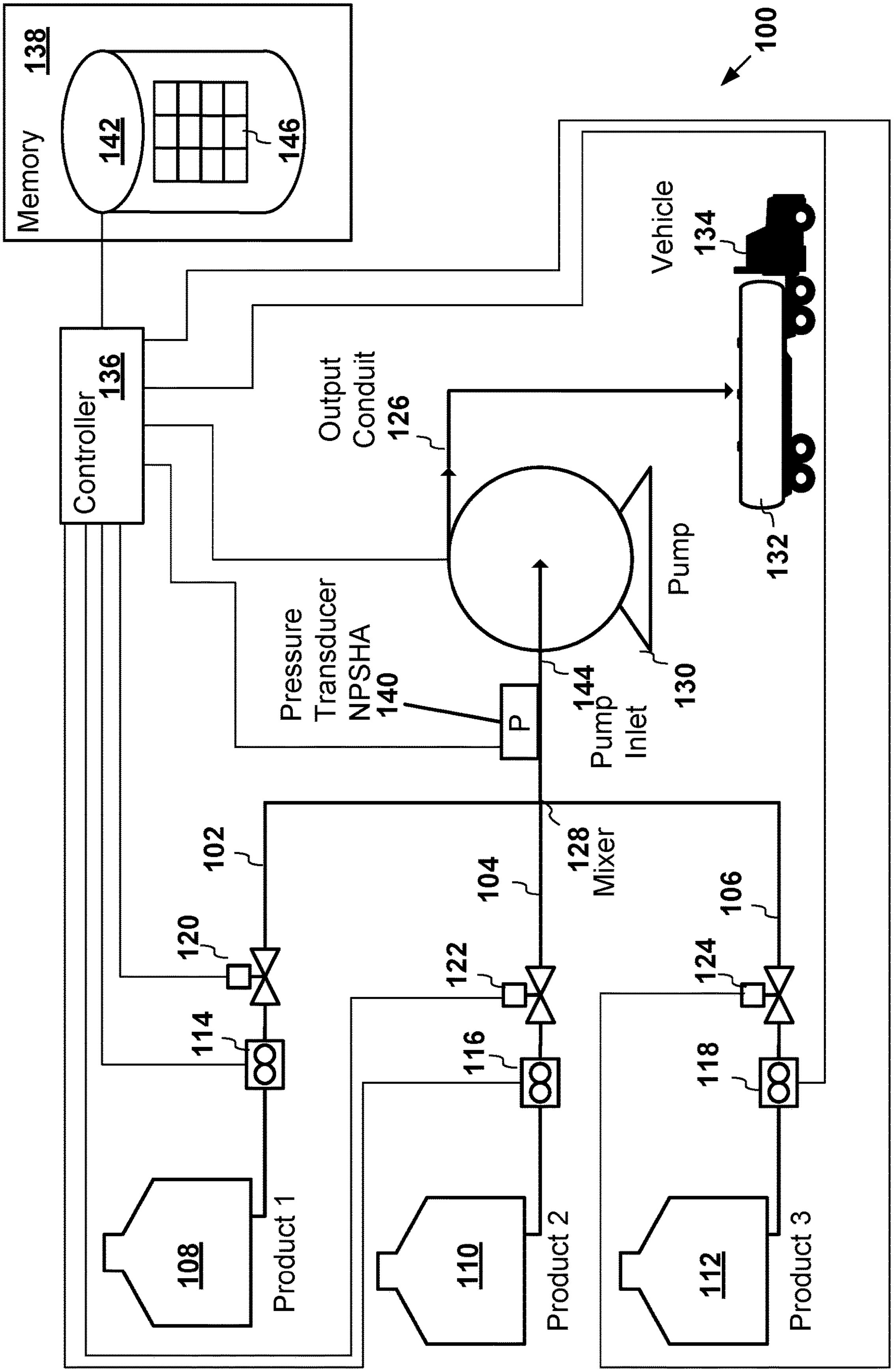
FIG. 1 is a schematic diagram of an example of a blending system.

In the de-icing industry there is a need to load liquid chemicals into trucks the truck vary in size from less than 100 gallon to several thousand gallons of capacity, the product or mixture of product to be loaded to a truck may change at any time, depending on weather conditions, road condition, cost and or availability of products. These truck tanks may have multiple compartments, which add to the challenges of filling tanks with a multi-product blend.

Historically if a blended product was to be used then a ratio of two or more products would be mixed into a storage tank then loaded to trucks a desired. The challenge with having pre-blended product in a storage tank is that it requires more storage capacity for the blended product, and the product blend ratio is difficult to change once mixed.

Another method of blending is to stack blend as filling the truck, where is one product at a time is added into the truck, this method while allowing for any ratio to be loaded at any given time and reduces the need for pre blended storage tanks, has limitations when vessels have multi compartments, where as a homogeneous liquid of a desired blend is not uniform thought tanks which may lead to slick and or dangerous ratio of chemicals be put onto the roadway.

The methods and systems herein describe a real-time blending with variable flow rate. With real-time blending to where what is being delivered to the vessel is a target ratio of a blend of products throughout the filling process at a desired flow rate. The system may create the correct blend via a controlled process to ensure that operator and or mechanical error are limited or eliminated. There are systems available that perform variable flow rates with real time blending; the commercially available systems use a series of pumps to blend a desired ratio of two or more products. These multi-pump systems are costly, require increased power to operate, are large and bulky, and may be difficult to tune due to pump fighting each other with head pressure. While the multi-pump systems may perform sufficiently, such systems are expensive to build and/or purchase and have complex set up and tuning procedures.

An alternative method is to use a single pump, which may or not be controlled via a variable speed pump drive motor to regulate flow to the truck, control valves on the inlet side of the pump that meter a desired ratio of each product to the pump to achieve a desired flow ratio of products and or blend. The advantage of the novel single pump systems is reduced power consumptions by having a single pump, reduced manufacturing cost, equipment footprint, and increased performance, more simple to tune, operate and optimizes performance. The challenge with developing such a system is to be able to control the overall product flow, and maintain the correct ratio of products and not to starve the pump of flow which may result in damaging pump cavitation. In the pump industry, this is commonly referred to as the relationship between NPSHR and NPSHA.

NPSHR (Net Positive Suction Head Required) is the minimum pressure at the suction port of the pump to prevent cavitation in the pump. Cavitation may cause cavitation erosion to portions of the pump, noisy or slow operation of the pump, and/or damage to the pump.

NPSHA (Net Positive Suction Head Available) at the pump impeller inlet is the absolute pressure at a suction port of the pump. The NPSHA must be greater or equal to NPSHR in order to prevent pump cavitation. Monitoring NPSHA at the pump inlet is possible using an absolute pressure gauge to detect the absolute pressure at the pump inlet. Controlling NPSHA at the pump inlet may be performed by regulating pump output flow and/or by a control valve at the pump inlet to increase or decrease free flow to the pump inlet.

FIG. 1 illustrates an example of a blending system 100 for blending fluids. The system 100 in the illustrated example includes a first conduit 102 configured to receive a first fluid from a first fluid source 108; a first flow meter 114 configured to detect a flow rate through the first conduit 102; a first flow control valve 120 configured to control a size of a flow passage to the first conduit 102 through the first flow control valve 120.

The illustrated example of the system 100 further includes a second conduit 104 configured to receive a second fluid from a second fluid source 110; a second flow meter 116 configured to detect a flow rate through the second conduit 104; a second flow control valve 122 configured to control a size of a flow passage to the second conduit 104 through the second flow control valve 122.

The illustrated example of the system 100 further includes a third conduit 106 configured to receive a third fluid from a third fluid source 112; a third flow meter 118 configured to detect a flow rate through the third conduit 106; a third flow control valve 124 configured to control a size of a flow passage to the third conduit 106 through the third flow control valve 124.

The illustrated example of the system 100 further includes an output conduit 126; a mixer 128 fluidly coupled to the first conduit 102, the second conduit 104, and the output conduit 126. The mixer 128 is configured to mix the first fluid with the second fluid to form a blended fluid and provide the blended fluid to the output conduit 126. Examples of the mixer 128 is a T-joint, a Y-joint, or any combination of joints.

The illustrated example of the system 100 further includes a variable speed pump 130 located downstream of the mixer 128. The variable speed pump 130 is configured to pump the blended fluid through the output conduit 126. The output conduit is configured to deliver the blended fluid to a tank 132 on a vehicle 134.

The illustrated example of the system 100 further includes a controller 136 a memory 138. As explained further below, the controller 136 is configured to adjust the first flow control valve 120, the second flow control valve 122, and the speed of the variable speed pump 130 to reach a target flow rate of the blended fluid and a target blend of the first fluid and the second fluid in the blended fluid. The target blend may be a ratio or any other indication of the amount of each fluid in the blended fluid.

Alternatively or in addition, the controller 136 is configured to adjust the first flow control valve 120, the second flow control valve 122, the third flow control valve 124, and the speed of the variable speed pump 130 to reach the target flow rate of the blended fluid, the blended fluid having a target blend of the first fluid, the second fluid, and the third fluid.

Although the illustrated example includes three fluid sources 108, 110, 112, other examples of the system 100 may have only two fluid sources 108 and 110 and, correspondingly, only two flow meters 114 and 116 and two flow control valves 120 and 122. In still other examples, the system 100 may include more than three fluid sources and, correspondingly, more than three flow meters and flow control valves.

The system 100 may include additional components, such as a variable frequency drive (VFD) (not shown) for controlling the speed of the variable speed pump 130. One such additional component may be a pressure transducer 140 configured to detect an absolute pressure at an inlet of the variable speed pump 130, which is equivalent to a Net Positive Suction Head Available (NPSHA) because of the location of the pressure transducer 140.

The series of sensors 114, 116, 118, 140, and controls 120, 122, 124, such as the VFD, for controlling pump motor speed RPM may be used by the controller 136. By controlling pump speed and or inlet free flow to the variable speed pump 130 and holding other variables constant, NPSHA may be controlled to a known and constant level.

In some examples, the VFD may control the pump speed as directed by the controller 136 in order to obtain the target flow rate. The flow meters 114, 116, and 118 measure the flow of each product (the first, second, and third fluids), and the pressure transducer 140 monitors the absolute pressure (NPSHA) at the pump inlet 144. The controller 136 may cause the first, second, and/or third flow control valve 120, 122, and 124 to adjust resistance of flow to the pump 130 so as to maintain a known and/or acceptable NPSHA and flow.

The controller 136 may be configured to determine an initial valve setting for the first flow control valve 120 and an initial pump speed setting for the variable speed pump 130 at which a target NPSHA and the target flow rate is achieved with the second flow control valve closed (and more generally, with all of the other flow control valves closed, such as the third flow control valve.) The initial valve setting for the first flow control valve 120 and the initial pump speed setting may be dependent on the vehicle 134 or type of vehicle.

The controller 136 may determine the initial valve setting and the initial pump speed setting based on a feedback loop in which the flow passage of the first flow control valve 120 is decreased and the speed of the variable speed pump 130 is increased until the target NPSHA is achieved by detecting the target NPSHA with the pressure transducer 140.

For example, the feedback loop further includes after the target NPSHA was achieved, adjustment of the speed of the variable speed pump 130 until the target flow rate is achieved. Then, after the target flow rate is achieved, adjust the first flow control valve 120 until the target NPSHA is detected again by the pressure transducer 140. The controller 136 may repeat the adjustment of the speed of the variable speed pump 130 and the adjustment of the first flow control valve 120 until the target NPSHA and the target flow rate are concurrently achieved.

Below is a specific example for a truck.

Flow Rate to a specific truck desired flow rate is effected by restrictions of plumbing, height of tank and other restrictions that may be present—Product flow rate is controlled by maintaining a constant NPSHA and regulating the Pump RPM to achieve the target flow rate.

First, start by learning the truck and system flow characteristics in order to determine the initial pump speed (for example, RPMs) and the initial control valve setting (for example, valve position) for the target flow rate and the target NPSHA:

Solve for the Target Flow Rate with a Fixed System

Filling a Truck:

Constants: Constants may include, for example, system configuration, pump configuration, motor, and restriction in output conduit 126 to and from pump 130 at the target flow rate.

Variables: Pressure at inlet side of the first flow control valve 120 due to change in head pressure with column height of liquid in first fluid source, which is a storage tank in this example. Another variable may include the ratio of first and second fluids in the blended fluid.

Main Carrier Product: The first fluid in FIG. 1 may be referred to a main carrier product. For example, the first fluid may be a brine solution. The first fluid flow may be controlled via the first flow control valve 120 to adjust to the target NPSHA. As indicate above, the NPSHA is measured by the pressure transducer 140. In addition, the first flow meter 114 may measure the instantaneous and total flow of the main carrier, the rate and volume of this product is used to calculate the desired flow rates of the additive products.

Additive Products: The second fluid and/or the third fluid in FIG. 1 may each be referred to as an additive product or simply an additive. The flow of the additive may be measured by the flow meter. The flow rate and total volume of the additive may be controlled by the second and/or third control valve 122 and/or 124 in order to maintain the target flow rate of the blended fluid at a target blend of the main product and the additive.

Example of learning the details for the truck in process control logic:

Constants:

PIN: 784

Target Flow Rate: 200 gallons per minute

Target Pump inlet pressure: 10 psi (absolute)

Main Carrier Product: NaCl Brine

In some examples, the system 100 may include a database 142. The database 142 may include a user profile for one or more users: Each user profile may include: Desired Ratio of product (in other words, the target blend), Maximum Volume allowed, the target flow rate, and a PIN. This information is used to fill the truck with the blended liquid based on a predefined parameters. For example, upon receiving a valid PIN from a user interface (not shown), the controller 136 may look up in the database 142 the preferences from the user profile to obtain flow rates, product ratios and allowable volume of product that may be loaded into the truck.

One of the variables to solve for in the learning process is the pump speed which will result in the target flow rate at the target pump inlet pressure (NPSHA).

Step a1: operator enters a truck id. For Example: Truck PIN number 784. The process of learning the truck may be stored in the database 142 for use at a later time during a regular filling process. As such, this process may only need to be performed one time, unless there are relevant system changes, such as changing the pump 130 or plumbing configurations.

Step a2: The operator connects the pump discharge hose to truck, enters the PIN and the target volume. Then Presses a start learn button.

Step a3: The first flow control valve 120 for the main product opens fully.

Step a4: the pump 130 ramps up revolution speed to achieve the target flow rate, for example, 200 GPM Step a5: The first flow control valve 120 for the main product begins to close to achieve the target NPSHA at the pump inlet 144. As the size of the opening of the flow passage through the first flow control value 120 decreases, so will the flow through the first flow control valve 120. For example, the target NPSHA may be 10 PSI absolute.

Step a6: After the target NPSHA is achieved, the pump speed is adjusted again to correct for the target flow rate, as in step a4 above.

Step a7: The first flow control valve 120 is adjusted again to achieve the target NPSHA value, which is 10 PSI absolute in this example.

Step a8: Steps a4 & a5 may be repeated until an equilibrium of the flow rate and the NPSHA are obtained to meet the target values.

Step a9: After equilibrium is achieved, the learning process may be considered complete, and the valve setting (for example, valve position) and the pump speed may be considered the initial value setting for the first flow control valve 120 and the initial pump speed setting for the pump 130. Accordingly, these two values may be recorded into the database 142 for the truck to indicate the values may be used to achieve the target NPSHA and the target flow rate. For example, the controller 136 may store the following in the database 142

Learned Data PIN 784
Required Pump RPM=1980
Main Carrier Valve Position=63.5%
Target NPSHA=10 PSI absolute
Target Flow rate=200 GPM Example of a Tuck Filling Process, which Occurs after Learning Process Described Above:

An operator enters the truck number, a desired volume to load, and desired blend (for example, ratio of fluids)

For example:
Truck: 784
Total Volume: 2000 gallons
Target ratio: 90:10
Main Carrier Product: NaCl Brine
Additive Product: Liquid Carbohydrate Step b1: The controller 136 calculates the total volume of each product. For example, Brine 0.9*2000 gallons=1,800 and 0.1*2000=200 gallons of carbohydrate.

Step b2. The controller 136 causes the first flow control valve 120 for the brine to be set to the initial valve setting learned above in step a.9 (which was, for example, 63.5% open). The controller 136 further determines an initial valve setting for the second flow control valve 122 from a predetermined association 146 of initial valve settings and corresponding combinations of target blends and target flow rates. For example, the predetermined association 146 may be a table of values and the controller 136 looks up the initial valve setting for the second flow control valve 122 from a table where the initial value setting is associated with the target flow rate and the target blend in the table of values. For example, the controller 136 looks up the initial value setting for the second flow control valve 122 in the predetermined association 146. For example, the initial value setting for the second flow control valve 122 may be 27% open, where the 27% open setting is the valve setting associated with the combination of the target blend (90:10 in this example) and the target flow rate (20 GPM in this example). The controller 136 sets the second flow control valve 122 for the carbohydrate fluid to the initial value setting determined for the second flow control valve 122.

Step b.3. The pump ramps up to the initial pump speed setting learned above given the desired learned target flow rate in a.9 at 1980 RPM and remains substantially constant throughout fill unless a fault occurs.

Step b4. The controller 136 monitors the NPSHA measured by the pressure transducer 140 at the pump inlet 144. The controller 136 adjusts the first flow control valve 120 on the first conduit 102, on which the main carrier brine is received, so as to maintain the target NPSHA learned in step a.9. For example, the target NPSHA is 10 psi absolute in this example. The flow rate for the main carrier is monitored with the first flow meter 114 in addition to monitor the total volume of blended liquid supplied through the output conduit 126.

Step b5: the target flow rate for the additive (the second fluid) is determined based on the current flow rate for brine (the first fluid). For example, if the actual flow rate for brine is at 182 GPM, then the target flow rate for the additive is 0.1×182 or 18.2 GPM. The controller 136 adjusts the second flow control valve 122 for the carbohydrate fluid in order to maintain the target blend of the additive and brine as the target flow rate for the additive relates to the actual flow rate of the main product. Alternatively, the actual volume of the brine may be used to calculate the target volume of additive need to achieve the target blend.

Step b6: After the target total volume of each product is reached then the controller 136 causes the filling process to stop, closes the flow control valves 120 and 122, and stops the pump 130.

Fault corrections: There may be one or more faults that occur such as, for example, no flow, device failure, and pump motor over current. If no flow is detected, the controller 136 may alter the process or shut the system 100 down depending on the severity of the fault and/or what the cause may be.

Overview of system: The system may include a single pump that is in communication with a flow meter of the main carrier product to determine the actual flow rate or the actual volume of the main carrier product. The pump 130 may or not be controlled with a variable speed pump motor to regulate flow to the target set point. Instead, the system 100 may include a single fixed speed motor in some examples. The fixed speed motor maintains a constant speed. The pump flow is determined by back pressure through a manual valve or back pressure due to hose size and other restrictions in the line such as a manual throttle valve. If equipped with a variable speed motor, the system 100 operates the pump 130 at the target speed to achieve the target flow rate for a selected user profile previously set up for the vehicle 134.

The pressure transducer 140 located at the pump inlet 144 detects the head pressure at the pump inlet 144. There may be one or more products to be blended with the single pump. For each product, the system 100 may include a flow meter and flow control valve on the inlet side of the pump 130, the main product control valve is in communication with the processor and is controlled to open or close to maintain a desired pump inlet pressure, the secondary products follow the actual flow rate of the main product to maintain a constant target flow rate as it relates to a desired ratio of additives given the actual flow rate of the main carrier product.

During the filling process the pump 130 may operate at a fixed speed to achieve a predetermined fill rate (volume/time) for the vehicle 134. The controller 136 may adjust the flow control valve 120 for the main carrier in order to maintain a predetermined pump inlet absolute pressure (NPSHA), which must be greater than NPSHR to prevent damage to the pump & creating a constant pressure below atmospheric pressure to allow for blending of additional products. The additional products requested to be blended with the main carrier product follow the main product total volume and current flow rate so that a uniform mixture is obtained at the pump outlet.

Examples aspects (variable flow rate) are described below.

Learning of truck to determine required RPM of pump to achieve a known target flow rate for a specific truck and valve position to achieve a desired NPSHA (pump inlet pressure, below atmospheric pressure A proportional control valve on the main carrier product that adjust to maintain a desired absolute pressure, below atmospheric pressure at the pump inlet NPSHA during the filling process.

Each product may be equipped with a flow meter, and control valve which are in communication with a processor.

Each product may be linked via a common conduit to a single liquid pump inlet.

The additive products flow rates are controlled to be a ratio of the main carrier product flow rate and total volume.

An alternative method for blending with a single pump is to not use a pressure transducer to measure and control NPSHA to a target value. Using control valves on the pump inlet to achieve a desired flow rate of each individual product could be obtained. And a desired blend of 2 or more products could be achieved. We elected not to use this method due to not knowing what the actual NPSHA is could lead to equipment failures due to pump cavitation.

Figure 2:
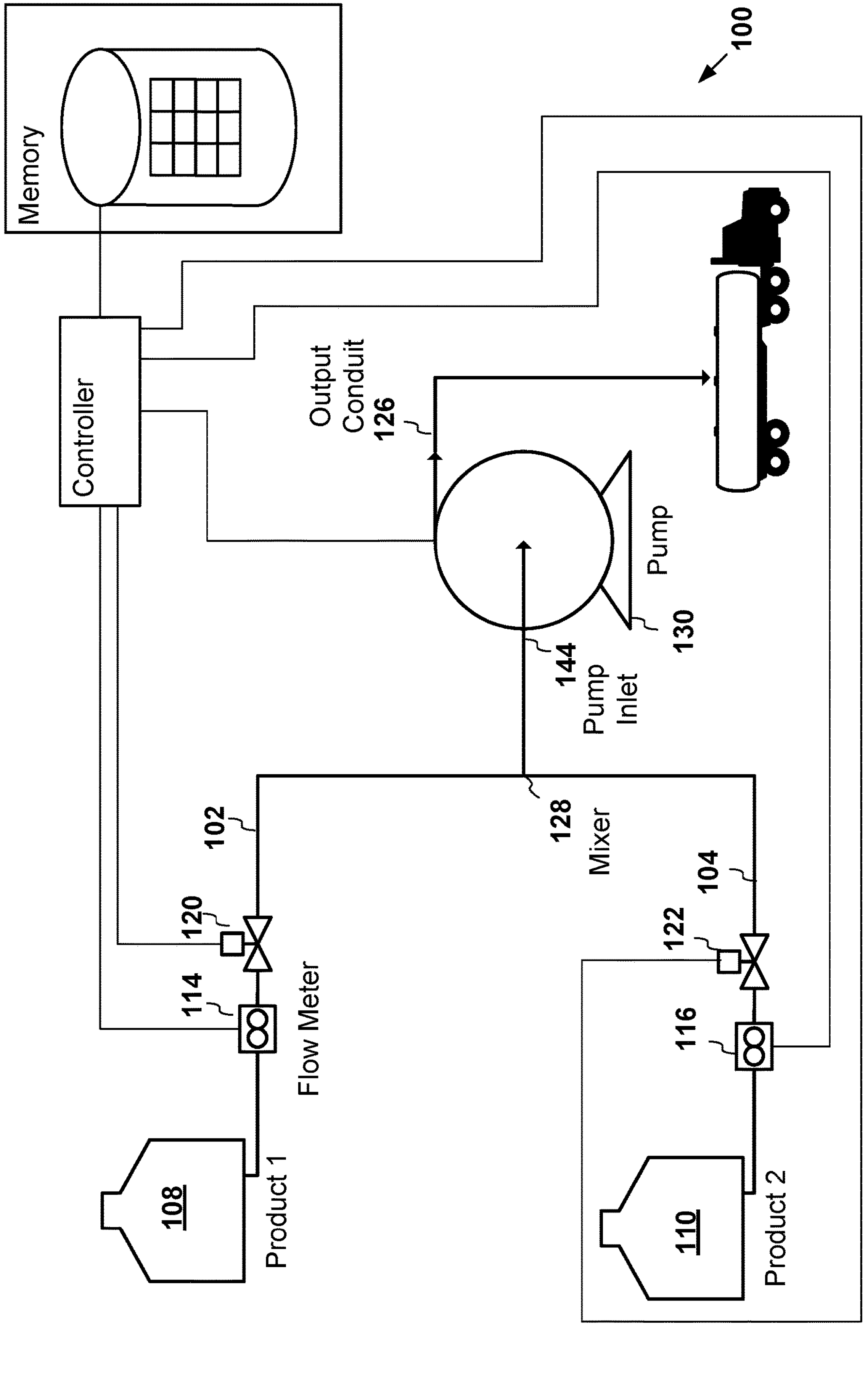
FIG. 2 is a schematic diagram of an example of a blending system that does not include a pressure transducer at an inlet of the pump.

In the example of the system 100 shown in FIG. 2, the pressure transducer 140 to measure pump NPSHA is omitted. Instead, a predetermined valve setting for the first flow control valve 120 may be selected, which was predetermined to be sufficient to achieve at least the target NPSHA. This method could be used to blend two or more products at the target flow rate with reduced risk of pump cavitation.

The first flow control valve 120, the second control valve 122, and the third flow control valve 122 may include any type of adjustable flow valve that is adjustable by a controller. Examples of the flow control valves may include a position control flow control valve and a proportional control valve.

The system 100 may be implemented with additional, different, or fewer components.

The database 142 may be any data structure configured to store data. Examples of the database 142 include a relational database, an objected oriented database, and a simple table data structure.

The controller 136 may be any processor, and may be in communication with the memory 138. In one example, the processor may also be in communication with additional elements, such as a display and/or a communication network interface. Examples of the processor may include a programmable logic controller, a general processor, a central processing unit, a microcontroller, a controller, a server, a laptop, a desktop computer, a mobile computing device, an application specific integrated circuit (ASIC), a digital signal processor, a field programmable gate array (FPGA), and/or a digital circuit, analog circuit.

The processor may be one or more devices operable to execute logic. The logic may include computer executable instructions or computer code embodied in the memory or in other memory that when executed by the processor, cause the processor to perform the features implemented by the logic. The computer code may include instructions executable with the processor.

The memory 138 may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The system may be implemented in many different ways. All of the discussion, regardless of the particular implementation described, is exemplary in nature, rather than limiting. For example, each component may include additional, different, or fewer components. As another example, each method may include additional, different, or fewer steps.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, programmable logic controller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A blending system for blending fluids, the blending system comprising:

A first conduit configured to receive a first fluid from a first fluid source, wherein the first fluid is a brine solution;

a first flow meter configured to detect a flow rate through the first conduit;

a first flow control valve configured to control a size of a flow passage to the first conduit through the first flow control valve;

a second conduit configured to receive a second fluid from a second fluid source;

a second flow control valve configured to control a size of a flow passage to the second conduit through the second flow control valve;

an output conduit;

a mixer coupled to the first conduit, the second conduit, and the output conduit, wherein the mixer is configured to mix the first fluid with the second fluid to form a blended fluid and provide the blended fluid to the output conduit;

a variable speed pump located downstream of the mixer, the variable speed pump configured to pump the blended fluid through the output conduit, wherein the output conduit is configured to deliver the blended fluid to a tank on a vehicle; and a controller configured to adjust the first flow control valve, the second flow control valve, and the speed of the variable speed pump to reach a target flow rate of the blended fluid, the blended fluid having a target blend of the first fluid and the second fluid.

2. The blending system of claim 1, wherein the target blend includes a target ratio of the first fluid to the second fluid.

3. The blending system of claim 1 further comprising a pressure transducer configured to detect a Net Positive Suction Head Available (NPSHA) at an inlet of the variable speed pump.

4. The blending system of claim 3, wherein the controller is configured to determine an initial valve setting for the first flow control valve and an initial pump speed setting for the variable speed pump at which a target NPSHA and the target flow rate is achieved with the second flow control valve closed.

5. The blending system of claim 4, wherein the controller is configured to determine the initial valve setting and the initial pump speed setting based on a feedback loop in which the flow passage of the first flow control valve is decreased and the speed of the variable speed pump is increased until the target NPSHA is achieved.

6. The blending system of claim 5, wherein the feedback loop further includes adjustment of the speed of the variable speed pump, after the target NPSHA was achieved, until the target flow rate is achieved, and thereafter, to adjust the first flow control valve until the target NPSHA is achieved, and to repeat the adjustment of the speed and the adjustment of the first flow control valve until the target NPSHA and the target flow rate are concurrently achieved.

7. The blending system of claim 4, wherein the controller is configured to determine the initial valve setting and the initial pump speed setting from a vehicle-specific set of initial settings.

8. The blending system of claim 1, wherein the controller is configured to determine an initial valve setting for the second flow control valve based on the target flow rate and the target blend of the first fluid and the second fluid, and the controller is configured to set the second flow control valve to the initial valve setting and to further adjust the second flow control valve to achieve the target blend.

9. The blending system of claim 8, wherein the initial valve setting for the second flow control valve is determined from a predetermined association of initial valve settings and corresponding combinations of target blends and target flow rates.

10. A blending system for blending fluids, the blending system comprising:

a first conduit configured to receive a first fluid from a first fluid source, wherein the first fluid is a brine solution;

a first flow meter configured to detect a flow rate through the first conduit;

a first flow control valve configured to control a size of a flow passage to the first conduit through the first flow control valve;

a second conduit configured to receive a second fluid from a second fluid source;

a second flow control valve configured to control a size of a flow passage to the second conduit through the second flow control valve;

an output conduit;

a mixer coupled to the first conduit, the second conduit, and the output conduit, wherein the mixer is configured to mix the first fluid with the second fluid to form a blended fluid and provide the blended fluid to the output conduit;

a fixed speed pump located downstream of the mixer, the fixed speed pump configured to pump the blended fluid through the output conduit, wherein the output conduit is configured to deliver the blended fluid to a tank on a vehicle; and a controller configured to adjust the first flow control valve and the second flow control valve to reach a target flow rate of the blended fluid, the blended fluid having a target blend of the first fluid and the second fluid.

11. The blending system of claim 1, wherein the first fluid source and the second fluid source are storage tanks.

12. The blending system of claim 10, wherein the controller is configured to determine an initial valve setting for the first flow control valve by selected the initial valve setting as a predetermined setting associated the target flow rate, and the predetermined setting is known cause a NPSHA (Net Positive Suction Head Available) of the pump to exceed a NPSHR (Net Positive Suction Head Required) when the second flow control valve closed.

13. The blending system of claim 10, wherein the target blend includes a target ratio of the first fluid to the second fluid.

14. The blending system of claim 10 further comprising a pressure transducer configured to detect a Net Positive Suction Head Available (NPSHA) at an inlet of the fixed speed pump.

15. The blending system of claim 10, wherein the controller is configured to determine an initial valve setting for the second flow control valve based on the target flow rate and the target blend of the first fluid and the second fluid, and the controller is configured to set the second flow control valve to the initial valve setting and to further adjust the second flow control valve to achieve the target blend.

16. The blending system of claim 15, wherein the initial valve setting for the second flow control valve is determined from a predetermined association of initial valve settings and corresponding combinations of target blends and target flow rates.

17. The blending system of claim 10, wherein the first fluid source and the second fluid source are storage tanks.

* * * * *